(12) United States Patent
Hiraishi et al.

(10) Patent No.: US 6,376,077 B1
(45) Date of Patent: Apr. 23, 2002

(54) PROCESS FOR THE PRODUCTION OF COUPLING AGENT-TREATED INORGANIC PARTICLES AND USE THEREOF

(75) Inventors: Wataru Hiraishi; Shunji Ohishi, both of Takamatsu (JP)

(73) Assignee: Kyowa Chemical Industry Co., Ltd., Takamatsu (JP)

( * ) Notice: Subject to any disclaimer, the term of this patent is extended or adjusted under 35 U.S.C. 154(b) by 0 days.

(21) Appl. No.: 09/287,180

(22) Filed: Apr. 6, 1999

(30) Foreign Application Priority Data

Apr. 10, 1998 (JP) .......................................... 10-116276

(51) Int. Cl.⁷ ................................................ B32B 5/16

(52) U.S. Cl. ........................ 428/403; 427/215; 427/220; 427/372.2; 427/377; 427/384; 428/404

(58) Field of Search ................................ 427/212, 215, 427/220, 372.2, 377, 384; 428/403, 404

(56) References Cited

U.S. PATENT DOCUMENTS

| 4,828,954 A | * | 5/1989 | Hashimoto et al. | 430/110 |
| 5,264,030 A | * | 11/1993 | Tanabe et al. | 106/401 |
| 5,411,761 A | * | 5/1995 | Inokuchi et al. | 427/220 |
| 5,415,936 A | * | 5/1995 | Deusser et al. | 428/405 |
| 5,665,511 A | * | 9/1997 | Imai et al. | 430/110 |
| 6,120,596 A | * | 9/2000 | Mizobuchi | 106/490 |

* cited by examiner

Primary Examiner—Hoa T. Le
(74) Attorney, Agent, or Firm—Wenderoth, Lind & Ponack, LLP

(57) ABSTRACT

A process for the production of coupling agent-treated inorganic particles, which process is excellent in surface-treatment uniformity and uses a coupling agent at high coefficient of utilization, the process comprising adding a solution of a coupling agent into an aqueous suspension of inorganic particles with stirring and, after the mixing with stirring, heat-drying the resultant suspension without dehydration by filtration and concentration, and a synthetic resin composition containing the above particles and having excellent properties.

15 Claims, No Drawings

PROCESS FOR THE PRODUCTION OF COUPLING AGENT-TREATED INORGANIC PARTICLES AND USE THEREOF

FIELD OF THE INVENTION

The present invention relates to a process for the production of coupling agent-treated inorganic particles suitable for use as an additive or a filler for a synthetic resin. Further, the present invention relates to a synthetic resin composition containing the above inorganic particles and a molded article obtained from the above synthetic resin composition. More specifically, the present invention relates to a process for the production of coupling agent-treated inorganic particles, which process is excellent in surface-treatment uniformity, uses an expensive coupling agent at high coefficient of utilization and further satisfies the fundamental requirements for forming a bond between a coupling agent and an inorganic particle surface, and relates to a synthetic resin composition containing the above inorganic particles and a molded article obtained from the above synthetic resin composition.

PRIOR ART OF THE INVENTION

Inorganic particles used as an additive or a filler for a synthetic resin are usually surface-treated with an organic agent such as a surfactant or a higher fatty acid in order to increase the compatibility with a polymer and improve the processability and the moldability of an obtained synthetic resin composition or improve the physical properties and the appearance of a molded article. Further, there are many proposals of incorporating inorganic particles treated with a variety of coupling agents into a synthetic resin. However, coupling agents are generally expensive. Further, a synthetic resin composition into which coupling agent-treated inorganic particles are incorporated is poor in processability. From these reasons, there has been hardly used inorganic particles treated with a coupling agent. Instead, in most cases, coupling agents have been used in a so-called integral blend method wherein higher fatty acid-treated inorganic particles are mainly used and a coupling agent is added, as required, at kneading for molding.

Recently, inorganic particles surface-treated with a coupling agent are required since it is desired to exploit and use the full performances of a coupling agent instead of the use of the coupling agent in the integral blend method.

As a method of surface-treating inorganic particles with a coupling agent, there is known a dryprocess. For example, the dry process is carried out as follows. While the dry powder of inorganic particles is heavily stirred in a Henschel mixer, an aqueous solution of a coupling agent is dropwise added or spray-injected with a spray or the like. And, the stirring is continued. Then, heat-drying is carried out in the mixer to obtain a treated product. This process is ordinarily used. In this dry process, the whole amount of the coupling agent aqueous solution is absorbed into the dry powder of the inorganic particles and the heat drying is carried out. Thereby, this dry process satisfies the treatment requirements for forming a chemical bond between the coupling agent and the inorganic particle surface along the chemical properties of the coupling agent. Due to this method, the coefficient of utilization of the coupling agent used for the treatment is naturally increased to the utmost. In this point, it can be said that a coupling agent is an optimum surface-treating agent for the dry treatment process.

There can be found proposals of methods comprising treating inorganic particles with a coupling agent by a wet surface-treatment process. However, these methods require using an organic solution such as alcohol so that the methods have too many problems for an industrial production.

When coupling agent-treated inorganic particles obtained by a conventional dry treatment process are incorporated into a synthetic resin, in many cases, the effect of improving properties can not be obtained as expected. The reason is considered to be as follows. In the conventional dry treatment, surface-treatment is nonuniform and part of the coupling agent works as a binder to strongly coagulate the inorganic particles each other, which deteriorate the dispersibility of the inorganic particles in the resin. When uniform surface-treatment can be obtained, the ubiquity of a coupling agent in inorganic particles is prevented. Therefore, the coupling agent does not work as a binder and good dispersibility is maintained. The effect of the coupling agent treatment is fully exerted. That is, it is supposed that the synthetic resin composition incorporated with a coupling agent is improved in physical properties.

The wet surface-treatment process is most recommended for attaining the uniform surface-treatment of inorganic particles with a coupling agent. However, when inorganic particles are wet-surface-treated with a coupling agent and then, as in a conventional method of obtaining a higher fatty acid-treated product, dehydrated by filtration before a drying step, the major part of the coupling agent used is lost due to its leak together with a filtrate. Furthermore, COD (chemical oxygen demand) in wastewater becomes high and it requires a high cost to treat the wastewater. The present inventors have studied the factors of the above problems and, as a result, reached the present invention.

SUMMARY OF THE INVENTION

It is an object of the present invention to provide a process for the production of coupling agent-treated inorganic particles, wherein the uniformity of surface-treatment by a wet treatment method and the high coefficient of a coupling agent by a dry treatment method are compatible.

It is another object of the present invention to provide a synthetic resin composition which can give a molded article excellent in physical properties when the coupling agent-treated inorganic particles are incorporated into a synthetic resin.

It is further another object of the present invention to provide a molded article obtained from the above synthetic resin composition.

According to the present invention, there is provided a process for the production of coupling agent-treated inorganic particles, which comprises adding a solution of a coupling agent into an aqueous suspension of inorganic particles with stirring and, after the mixing with stirring, heat-drying the resultant suspension without dehydration by filtration and concentration. Further, there is provided a synthetic resin composition containing 100 parts by weight of a synthetic resin and 1 to 300 parts by weight of the coupling agent-treated inorganic particles obtained by the above process. Furthermore, there is provided a molded article obtained from the above synthetic resin composition. Still further, there is provided coupling-agent treated inorganic particles obtained by the above production process.

DETAILED DESCRIPTION OF THE INVENTION

The inorganic particles used in the production process of the present invention are metal compounds such as a hydroxide, a carbonate, a basic carbonate, a basic sulfate, a phosphate, a silicate and an oxide of a metal. The specific examples of the metal compounds suited for use in the present invention include aluminum hydroxide, magnesium hydroxide, solid solution hydroxide: $Mg_{1-x}M_x(OH)_2$, wherein M is a divalent metal such as Mn, Co, Fe, Ni or Zn and X<1, a hydrotalcite compound, $LiAl_2(OH)_6 A^{n-}{}_{1/n}\cdot mH_2O$, wherein A is an anion having a valence of n and m>3, a chalcoalumite type compound, magnesium carbonate, calcium carbonate, basic calcium carbonate, dawsonite, basic magnesium sulfate: $Mg_6(OH)_{10}SO_4\cdot 3.H_2O$, calcium phosphate, talc, mica, kaolin, alumina, titania, magnesia, hydrozincite and spinel type oxides [$MgAl_2O_4$ and $ZnAl_2O_4$]. The production process of the present invention is suited for surface-treating inorganic particles such as a magnesium hydroxide which serves a useful function as a flame-retardant for synthetic resins and which has a BET specific surface area of 15 m²/g or less and an average secondary particle diameter of 2 μm or less and whose primary crystal particle has a shape of hexagonal platelet, and a hydrotalcite compound which serves a useful function as an additive, e.g. stabilizer, for synthetic resins and which has a BET specific surface area of 40 m²/g or less and an average secondary particle diameter of 4 μm or less.

The BET specific surface area was obtained by measuring absorption of nitrogen at the boiling point of nitrogen and applying a BET method based on the nitrogen absorption occupied area of 16.2 Å. The average secondary particle diameter was obtained by measuring a particle size distribution according to a laser diffraction scattering method. The shape of the primary crystal particle was observed with a scanning electron microscope (SEM) photograph of about 10,000 magnifications.

Concerning the concentration of the aqueous solution of the inorganic particles used in the present invention, when the viscosity is especially high, it is inevitable to adopt a low concentration. However, a high concentration is preferred in view of drying efficiency with a spray dryer or the like. An adaptable concentration is from 0.1% by weight to 40% by weight. However, in view of productivity and economy, it is preferably from 5 to 30% by weight, more preferably from 10 to 25% by weight. In the spray drying, the suspension of the surface-treated inorganic particles maybe sprayed by any method such as a rotary atomizer method, a nozzle spray method or a disk spray method. The diameter of a fine droplet is preferably about 50 to 1,200 μm, more preferably 100 to 600 μm. When the diameter of the droplet is lager than the upper limit of the above range, the dropping speed is fast, time when the droplets are present in hot air is shortened, the drying time is likely to be insufficient and products to be obtained are likely to be insufficient in drying. The preferred drying time, i.e., the residence time in the hot air is generally several seconds to several ten seconds. When the diameter of the droplet is smaller than the lower limit of the above range, the droplets become a powder which has fine particles and is poor in flowability, which deteriorates workability. The temperature of the hot air is preferably in the range of about 100 to 600° C., more preferably in the range of 120 to 500° C. When the temperature of the hot air is lower than the above range, undesirably, the drying is likely to be insufficient. When the temperature of the hot air is higher than the above range, undesirably, products therefrom may be pyrolized.

The coupling agent used in the present invention is a variety of silane-coupling agents and titanate coupling agents. Examples of these include vinyl-containing silane compounds such as vinylethoxysilane, vinyltrimethoxysilane, vinyle.tris(β-methoxyethoxy)silane and γ-methacryloxypropyltrimethoxysilane, amino-containing silane compounds such as γ-aminopropyltrimethoxysilane, N-β-(aminoethyl)γ-aminopropyltrimethoxysilane, N-β-(aminoethyl)γ-aminopropylmethyldimethoxysilane and γ-ureidopropyltriethoxysilane, epoxy-containing silane compounds such as γ-glycidoxypropyltrimethoxysilane, β-(3,4-epoxycyclohexyl)ethyltrimethoxysilane and γ-glycidoxypropylmethyldiethoxysilane, mercapto-containing silane compounds such as γ-mercaptopropyltrimethoxysilane, phenylamino-containing silane compounds such as N-phenyl-γ-aminopropyltrimethoxysilane, titanate compounds such as isopropyltriisostearoyl-modified titanate, tetraoctylbis (ditridecylphosphite)titanate, bis(dioctylpyrophosphate) oxyacetatetitanate, isopropyltridodecylbenzensulfonyltitanate, isopropyltris (dioctylpyrophosphate)titanate, tetraisopropylbis (dioctylphosphite)titanate, tetra(1,1-diallyloxymethyl-1-butyl)bis-(ditridecyl)phosphite titanate, bis (dioctylpyrophosphate)ethylenetitanate, isopropyltrioctanoyltitanate, isopropyldimethacrylisostearoyltitanate, isopropyltristearoyldiacryltitanate, isopropyltri (dioctylphosphate)titanate, isopropyltricumylphenyltitanate, dicumylphenyloxyacetatetitanate and diisostearoylethylenetitanate.

The amount of the coupling agent used for surface-treatment is preferably 0.01 to 3% by weight based on the inorganic particles, more preferably 0.05 to 2% by weight. When the amount of the coupling agent used is beyond the above range, there can not be obtained inorganic particles which can provide a practical synthetic resin composition or a molded article well-balanced in the values of mechanical, physical properties and in chemical properties.

The solution of a coupling agent used for surface-treatment in the present invention may be used as a stock solution. It may be also used as a dilution of a coupling agent with water and/or an alcohol. The solution of water and/or an alcohol may be pH-adjusted by adding an acid in advance. A special way such as a spraying with a spray is not required for adding the solution of a coupling agent. It is sufficient to merely add the solution of a coupling agent in a predetermined amount into the suspension of inorganic particles exactly. In the stirring after the addition, Especially strong stirring strength is not required so long as the resultant suspension is uniformly mixed within a predetermined time.

The production process of the present invention is a production process wherein the aqueous suspension of inorganic particles surface-treated by a wet process is dried, substantially as it is, without dehydration by filtration using a vacuum filter or a pressure filter nor concentration, preferably dried with a spray dryer, to obtain coupling agent-treated inorganic particles. In the conventional production process which does not use a spray dryer, dehydration by filtration should be carried out before the drying. In this case, the coupling agent moves into the filtrate and the moved coupling agent is lost. Further, since the dehydrated cake has a thixotropic viscoelasticity, there are problems that it is difficult to separate the cake from the filter cloth and that it is impossible to pulverize the cake finely. It is difficult or almost impossible to adopt the conventional drying step. The production process of the present invention can avoid the many problems described above.

In the present invention, the synthetic resin includes polyolefins such as low-density polyethylene, mediumdensity polyethylene, high-density polyethylene, linear low-density polyethylene, ultra-low-density polyethylene, an ethylene-vinyl acetate copolymer, an ethylene-ethyl acrylate copolymer, an ethylene-propylene copolymer, a propylene homopolymer, an ethylene-propylene rubber, an ethylene-propylene-diene rubber, polybutene and butyl rubber, polyolefin-containing thermoplastic elastomers such as polypropylene-containing thermoplastic elastomer, polyethylene-containing thermoplastic elastomer and polystyrene-containing thermoplastic elastomer, epoxy resins such as bisphenol A type epoxy resin, cresol novolak type epoxy resin, phenol novolak type epoxy resin, biphenyl type epoxy resin, naphthalene ring-containing epoxy resin, allyl phenol novolak type epoxy resin, alicyclic epoxy resin, heterocyclic epoxy resin and halides of these, polyamide resins such as polyamide 6, polyamide 66, polyamide 610, polyamide 12 and polyamide 46, polyurethane, HIPS, PS, ABS and polyester.

When a coupling agent-treated inorganic product obtained by the production process of the present invention is used in a synthetic resin composition as an additive or a filler, there is provided a resin composition having excellent mechanical properties and chemical properties which conventional fatty acid-treated products can not give, by selecting the kind of a coupling agent and the kind of a synthetic resin properly. Further, there is obtained a molded article from the resin composition. For example, when a product treated with an amino-containing silane coupling agent is used for EVA (ethylene.vinyl acetate copolymer) or EEA (ethylene.ethyl acrylate copolymer) or when inorganic particles treated with an amino-containing silane coupling agent or a mercapto-containing silane coupling agent are used for a TPO(thermoplastic polyolefin elastomer)-based resin, high values are maintained in both of tensile strength and elongation. Further, when inorganic particles treated with an epoxy-containing silane coupling agent or an amino-containing silane coupling agent are used for an epoxy resin, the physical properties of a cured material is increased without delaying a curing reaction, and there is obtained an epoxy resin composition excellent in resistance to water absorption and resistance to thermal shock.

The present invention will be explained more in detail based on examples.

EXAMPLES 1 to 5

Comparative Examples 1 and 2

Magnesium hydroxide having an average secondary particle diameter of 0.58 $\mu$m and a BET specific surface area of 6.5 m$^2$/g was used to prepare an aqueous suspension having a Mg(OH)$_2$ concentration of 150 g/liter. A 5% by weight aqueous solution of γ-aminopropyltriethoxysilane was prepared and added, in an addition amount shown in Table 1, into the aqueous suspension of the magnesium hydroxide with stirring. After stirred for 30 minutes, the resultant suspension was introduced to a spray dryer and dried.

In comparative example 1, 1.5 kg of dry powder of the same magnesium hydroxide as used in example 1 was charged in a Henschel mixer having a volume of 20 liters, and 150 ml of a 5% by weight aqueous solution of γ-aminopropyltriethoxysilane was added with stirring the dry powder at a high speed. During the stirring, the procedure, in which the stirring was stopped, materials attached to the inwall and the stirring wall were raked and dropped and the stirring was re-started, was repeated three times. After the treatment, the temperature was increased to 100° C., and the product was dried and then pulverized.

In Comparative Example 2, the wet treatment was carried out in the same manner as in Example 1. Then, the dehydration was carried out with a press filter and the product was dried and pulverized.

Table 1 shows the analytic values (shown in "absorption amount") of the treating agent content in the so-obtained magnesium hydroxides treated with γ-aminopropyltriethoxysilane and the measured values of the average particle diameters.

TABLE 1

|  | Ex.1 | Ex.2 | Ex.3 | Ex.4 | Ex.5 | CEx.1 | CEx.2 |
|---|---|---|---|---|---|---|---|
| Addition amount (wt %) | 0.3 | 0.4 | 0.5 | 0.6 | 1.0 | 0.5 | 1.0 |
| Absorption amount (wt %) | 0.20 | 0.29 | 0.39 | 0.40 | 0.63 | 0.30 | 0.1 |
| coefficient of utilization (%) | 66 | 72 | 70 | 67 | 63 | 60 | 10 |
| Average secondary particle diameter ($\mu$m) | 0.55 | 0.58 | 0.58 | 0.58 | 0.60 | 0.70 | 0.58 |

Ex. = Example, CEx. = Comparative Example.

(1) "Absorption amount": the content in the treating agent molecule calculated from the Si content obtained by fluorescence X-ray analysis.
(2) "Coefficient of utilization" (%)=(absorption amount/ addition amount)×100.

Concerning the products using this aminosilane-containing treating agent, as shown in the results of Table 1, the values of the coefficient of utilization in the wet surface-treatment—spray dryer drying process using an aqueous solution are greater than that of the dry treatment using a Henschel mixer. In the dry treatment, the average particle diameter was 0.70 $\mu$m, and this value was considerably larger than the initial value, 0.58 $\mu$m, of the magnesium hydroxide. This fact means that strong aggregations occurred in part. In contrast, it is found that the dispersibility was excellent in the wet treatment.

EXAMPLES 6 to 9

Comparative Examples 3 and 4

A coupling agent-treated magnesium hydroxide was obtained in the same manner as in Example 1 except that a magnesium hydroxide having an average secondary particle diameter of 0.52 $\mu$m and a BET specific surface area of 7.2 m$^2$/g was used and that a 5% by weight aqueous solution of vinylethoxysilane, which solution was pH-adjusted at pH 3.5 to 4.0 by adding an acid, was used as a solution of a surface-treating agent.

In Comparative Example 3, the same dry treatment as in Comparative Example 1 was carried out in a Henschel mixer except that the same magnesium hydroxide as in Example 8 was used, that the same treating agent as in Example 8 was used and that the addition amount of the treating agent was the same amount as that in Example 8.

In comparative example 4, the same procedures as in Example 8 were carried out until the same wet treatment as in Example 8 was carried out. After the wet treatment, dehydration by filtration, drying and pulverization were carried out in the same manner as in Example 2.

Table 2 shows the results.

TABLE 2

|  | Ex.6 | Ex.7 | Ex.8 | Ex.9 | CEx.3 | CEx.4 |
|---|---|---|---|---|---|---|
| Addition amount (wt %) | 0.4 | 0.7 | 1.0 | 1.5 | 1.0 | 1.0 |
| Absorption amount (wt %) | 0.10 | 0.41 | 0.57 | 0.92 | 0.55 | 0.09 |
| coefficient of utilization (%) | 25 | 58 | 57 | 61 | 55 | 9 |
| Average secondary particle diameter ($\mu$m) | 0.50 | 0.52 | 0.52 | 0.53 | 0.70 | 0.52 |

Ex. = Example, CEx = Comparative Examples.

EXAMPLES 10 and 11

Comparative Example 5

A coupling agent-treated magnesium hydroxide was obtained in the same manner as in Example 1, except that a magnesium hydroxide having an average secondary particle diameter of 0.66 $\mu$m and a BET specific surface area of 6.2 m$^2$/g was used and that a 5% by weight aqueous solution of $\gamma$-glycidoxypropyltrimethoxysilane, which solution was used for surface-treatment after stirring the aqueous solution for 15 minutes or more and dissolving it fully, was used as a solution of a surface-treating agent In Comparative Example 5, wet surface-treatment was carried out in the same manner as in Example 10. Then, the same procedures as in Comparative Example 2 were carried out.

Table 3 shows the results.

TABLE 3

|  | Ex. 10 | Ex. 11 | CEx. 5 |
|---|---|---|---|
| Addition amount (wt %) | 1.0 | 0.3 | 1.0 |
| Absorption amount (wt %) | 0.85 | 0.24 | 0.12 |
| coefficient of utilization (%) | 85 | 80 | 12 |

Ex. = Example, CEx = Comparative Examples.

EXAMPLE 12

Comparative Examples 6 and 7

100 parts by weight of ethylene-ethyl acrylate copolymer (EEA: "NUC830"), 20 parts by weight of maleic anhydride-modified polyethylene (supplied by J.P.O, "M polymer"), 1 part by weight of antioxidant (supplied by Ciba Geigy, "Irganox1010") and 150 parts by weight of each sample (samples obtained in Example 3 and Comparative Example 1 and a stearic acid-treated magnesium hydroxide (a fatty acid-treated product)) were mixed and the mixture was kneaded with a single-screw extruder at 190° C., to obtain pellets. The pellets were vacuum-dried at 50° C. for 16 hours. Then, the dried pellets were pressure-molded with a pressing machine at 190° C. for 5 minutes. The pressure molding was repeated two times, to obtain a sheet. A dumbbell specimen was stamped out from the sheet. The dumbbell specimen was used as a test piece for measuring values of a variety of properties.

TABLE 4

|  | Ex. 12 | CEx. 6 | CEx. 7 |
|---|---|---|---|
| MI (g/10 min) | 0.21 | 0.14 | 0.34 |
| MFR (g/10 min) | 30 | 20 | 39.4 |
| Tensile strength at yield point (kgf/mm$^2$) | 0.70 | 0.65 | 0.60 |
| Tensile strength at break (kgf/mm$^2$) | 1.15 | 0.95 | 0.90 |
| Elongation (%) | 630 | 510 | 640 |
| Sample | Ex. 3 | CEx. 1 | stearic acid-treated magnesium hydroxide |

Ex. = Example, CEx = Comparative Examples.

The coupling agent-treated product of the present invention is excellent in mechanical properties over the fatty acid-treated product and the product treated with a coupling agent by a dry process. Further, the product of the present invention is excellent in processability over the dry treatment product.

EXAMPLES 13 to 16

Comparative Examples 8 and 9

A coupling agent-treated magnesium hydroxide was obtained in the same manner as in Example 1 except that a magnesium hydroxide having an average secondary particle diameter of 0.60 $\mu$m and a BET specific surface area of 6.8 m$^2$/g was used, that a 5% by weight aqueous solution of $\gamma$-methacryloxypropyltrimethoxysilane, which solution was pH-adjusted at pH 3.5 to 4.0 by adding an acid, was used as a surface-treating solution and that the addition amount thereof was changed to that shown in Table 5.

In Comparative Example 8, the same dry treatment as in Comparative Example 1 was carried out in a Henschel mixer except that the same magnesium hydroxide and treating solution as those in Example 16 were used and that the addition amount of the treating solution was the same amount as that in Example 16.

In Comparative Example 9, the same magnesium hydroxide and treating solution as those in Example 15 were used. Further, the addition amount of the treating solution was the same amount as that in Example 15. The same procedures as in Example 1 were carried out until the same wet treatment as in Example 1 was carried out. After the wet treatment, dehydration by filtration, drying and pulverization were carried out in the same manner as in Comparative Example 2.

Table 5 shows the results.

TABLE 5

|  | Ex.13 | Ex.14 | Ex.15 | Ex.16 | CEx.8 | CEx.9 |
|---|---|---|---|---|---|---|
| Addition amount (wt %) | 0.3 | 0.5 | 1.0 | 1.5 | 1.5 | 1.0 |
| Absorption amount (wt %) | 0.22 | 0.35 | 0.74 | 1.03 | 1.05 | 0.1 |
| coefficient of utilization (%) | 73 | 70 | 74 | 69 | 70 | 10 |

TABLE 5-continued

|  | Ex.13 | Ex.14 | Ex.15 | Ex.16 | CEx.8 | CEx.9 |
|---|---|---|---|---|---|---|
| Average secondary particle diameter (μm) | 0.62 | 0.65 | 0.68 | 0.69 | 0.97 | 0.62 |

Ex. = Example, CEx = Comparative Examples.

EXAMPLES 17

Comparative Examples 10 and 11

100 parts by weight of ethylene-vinyl acetate copolymer (EVA: "RB-11"), 1 part by weight of antioxidant (supplied by Ciba Geigy, "Irganox1010"), 0.5 part by weight of cross-linker (DCP) and 200 parts by weight of each sample (the coupling agent-treated magnesium hydroxides obtained in Example 16 and Comparative Example 8 and the same magnesium hydroxide as used in Comparative Example 7) were mixed and the mixture was kneaded with a single-screw extruder at 100° C., to obtain pellets. The pellets were vacuum-dried at 50° C. for 16 hours. Then, the dried pellets were crosslink-molded at 180° C. to obtain a sheet. A dumbbell specimen was stamped out from the sheet. The dumbbell specimen was used as a test piece for measuring values of properties. Table 6 shows the results.

TABLE 6

|  | Ex. 17 | CEx. 10 | CEx. 11 |
|---|---|---|---|
| Tensile strength at yield point (kgf/mm²) | 1.33 | 0.95 | 0.82 |
| Elongation at break (%) | 230 | 180 | 250 |
| Sample | Ex. 16 | CEx. 8 | stearic acid-treated magnesium hydroxide |

Ex. = Example, CEx = Comparative Examples.

Effect of the Invention

According to the present invention, there is provided a process for the production of inorganic particles which has a high coefficient of utilization of a coupling agent and actualize uniform surface-treatment. Further, there is provided a synthetic resin composition which contains the inorganic particles obtained by the above process and can give a molded article excellent in physical properties, processability and appearance.

What is claimed is:

1. A process for the production of coupling agent-treated inorganic particles, which comprises adding a solution of a coupling agent into an aqueous suspension of inorganic particles with stirring and, after the mixing with stirring, drying the resultant suspension without dehydration by filtration and concentration, wherein the drying is carried out within several ten seconds by spraying the resultant suspension as fine droplets into hot air having a temperature of from 100 to 600° C.

2. The process according to claim 1, wherein the inorganic particles are at least one compound which is selected from the group consisting of hydroxides, carbonates, basic carbonates, basic sulfates, phosphates, silicates and oxides of a metal.

3. The process according to claim 1, wherein the solution of the coupling agent is a stock solution, an aqueous solution or an alcoholic solution of a silane-coupling agent or a titanate coupling agent.

4. The process according to claim 1, wherein the fine droplets have a diameter of 50 to 1,200 μm.

5. The process according to claim 1, wherein the amount of the coupling agent is in the range of 0.01 to 3% by weight based on the inorganic particles.

6. The process according to claim 1, wherein a spray dryer is used for the drying.

7. Coupling-agent treated inorganic particles obtained by the production process recited in claim 1.

8. Coupling-agent treated inorganic particles according to claim 7, wherein the inorganic particles are at least one compound which is selected from the group consisting of hydroxides, carbonates, basic carbonates, basic sulfates, phosphates, silicates and oxides of a metal.

9. Coupling-agent treated inorganic particles according to claim 7, wherein the inorganic particles are a magnesium hydroxide which has a BET specific surface area of 15 $m^2/g$ or less and an average secondary particle diameter of 2 μm or less and whose primary crystal particle has a shape of hexagonal platelet.

10. Coupling-agent treated inorganic particles according to claim 7, wherein the inorganic particles are a hydrotalcite compound having a BET specific surface area of 40 $m^2/g$ or less and an average secondary particle diameter of 4 μm or less.

11. A synthetic resin composition containing 100 parts by weight of a synthetic resin and 1 to 300 parts by weight of the coupling agent-treated inorganic particles obtained by the process of claim 1.

12. A composition according to claim 11, wherein the inorganic particles are a magnesium hydroxide which has a BET specific surface area of 15 $m^2/g$ or less and an average secondary particle diameter of 2 μm or less and whose primary crystal particle has a shape of hexagonal platelet, or a hydrotalcite compound having a BET specific surface area of 40 $m^2/g$ or less and an average secondary particle diameter of 4 μm or less.

13. A composition according to claim 11, wherein the synthetic resin is a polyolefin resin and the coupling agent-treated inorganic particles are a magnesium hydroxide treated with a vinyl-containing silane-coupling agent, an amino-containing silane-coupling agent or a methacryloxy-containing silane-coupling agent.

14. A composition according to claim 11, wherein the synthetic resin is an epoxy resin and the coupling agent-treated inorganic particles are a hydrotalcite compound treated with an epoxy-containing or amino-containing silane-coupling agent.

15. A molded article obtained from the synthetic resin composition recited in claim 11.

* * * * *